Dec. 6, 1966     A. S. BOHRER ETAL     3,289,516
MASKING CUTTER
Filed March 15, 1965
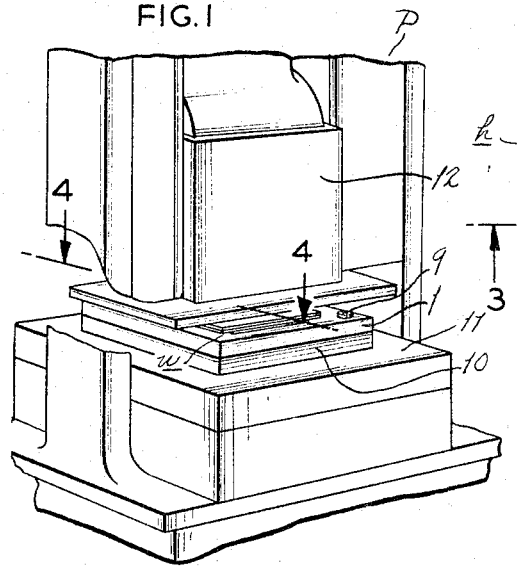
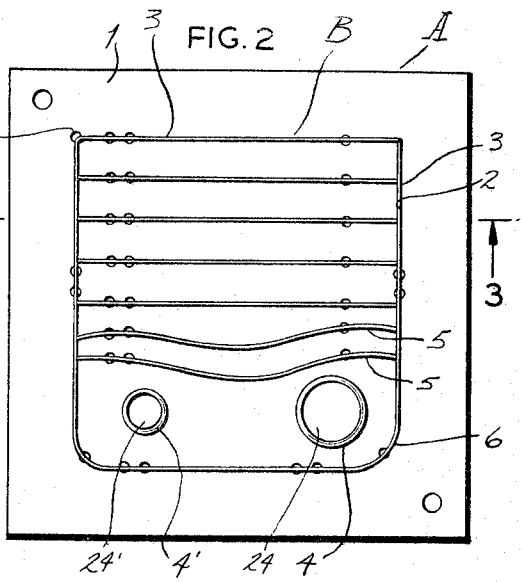
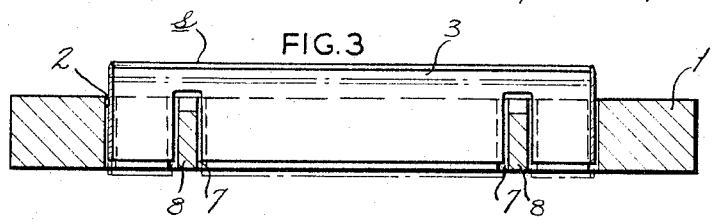
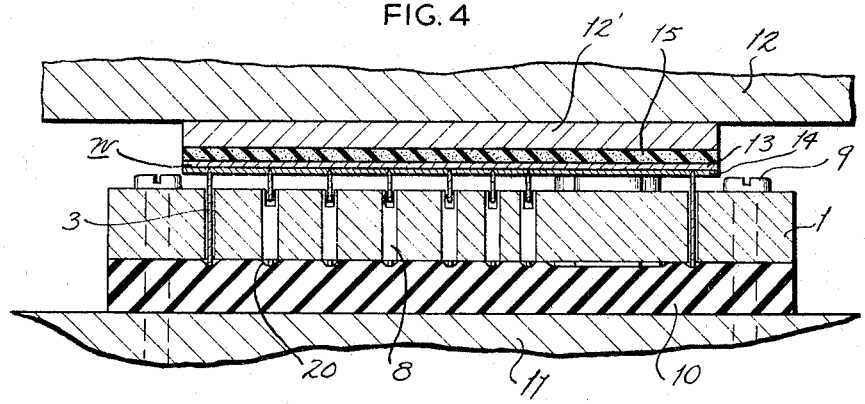
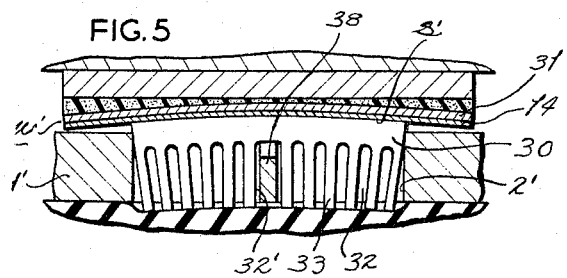
INVENTORS
ALPHONSE S. BOHRER
AND DONALD C. APPLE
BY Ralph W. Kalish
ATTORNEY United States Patent Office 3,289,516
Patented Dec. 6, 1966

3,289,516
MASKING CUTTER
Alphonse S. Bohrer, 6932 Zaharias Court, and Donald C. Apple, 1234 Dammert Ave., both of Lemay, Mo.
Filed Mar. 15, 1965, Ser. No. 439,868
10 Claims. (Cl. 83—588)

This invention relates in general to cutters and, more particularly, to cutting dies, preferably of the steel rule character, for the cutting of masking applied to metal parts.

In the manufacture and fabrication of various types of machinery, equipment, articles, and the like it is often requisite that certain surface zones of components be delineated for subsequent treatment, as by acid, for reduction to meet design, decoration, or weight requirements. In such cases it is common practice to apply masking, as by coating, tape, or the like, to the particular parts and then effect a cutting of such masking with subsequent removal to expose the predetermined area or areas for acid treatment or "chemical milling" to bring about metal removal. In such procedures it is critical that just the masking be subjected to the cutting action so that the underlying metal is not in any way scratched, gouged, or cut. However, heretofore the masking cutting action has been necessarily accomplished by hand and with the obvious, expected result that, since an operator cannot manually apply a continuous, consistent, even pressure throughout the cutting action, the cutting tool will penetrate the underlying metal to a harmful extent. But, such damage to the metal has been a reluctantly accepted condition. After the cut masking has been removed, the exposed metal is then subjected to acid treatment as by means of an etching bath which will act upon the exposed area so as to bring about a resultant lessening of the thickness thereof, to an extent depending upon the length of the acid treatment. It will be seen that if such exposed metal has been in any way mutilated by the cutting tool causing the development of furrows, nicks, scratches and the like, the acid will obviously penetrate to an uncontrolled depth and furthermore any such furrows along the line of cut will permit acid to penetrate outwardly of the exposed areas and under adjacent portions of the masking still covering adjacent zones of the component whereby the intended protection will be lost.

Therefore, it is an object of the present invention to provide a masking cutter which is adapted to automatically cut the masking but without causing any cutting of the underlying metal.

It is a further object of the present invention to provide a cutter of the type stated which is readily adapted for use in a press and the operation of which obviates the heretofore accepted manual cutting practice.

It is a still further object of the present invention to provide a masking cutter which may be most economically manufactured; which may be most simply mounted upon a press; which is durable and reliable in usage; which does not require the services of a skilled attendant; and the operation of which assures of the desired weight reduction in any part without damage or adverse effect upon surrounding zones.

Other objects and details of the invention will be apparent from the following description, when read in connection with the accompanying drawings.

FIGURE 1 is an isometric view of a press having mounted thereon a masking cutter constructed in accordance with and embodying the present invention.

FIGURE 2 is a plan view of a masking cutter constructed in accordance with and embodying the present invention.

FIGURE 3 is a vertical transverse sectional view taken along the line 3—3 of FIGURE 2.

FIGURE 4 is a vertical transverse sectional view taken along the line 4—4 of FIGURE 1.

FIGURE 5 is a vertical transverse sectional view taken substantially along the line 4—4 of FIGURE 1 but illustrating another form of masking cutter constructed in accordance with and embodying the present invention.

Referring now by reference characters to the drawings which illustrate practical embodiments of the present invention, A designates a masking cutter or cutting die comprising a base plate 1 formed of suitable rigid material but which is preferably constructed of wood for economy purposes; said plate 1 having a plurality of elongated, narrow slot-like openings or blade receptacles 2 extending therethrough for receiving cutting blades or elements, denoted generally B, as formed from steel rule stock. It is quite apparent that the particular configuration of any blades B will be determined by the outline of the areas to be cut thereby so that FIGURE 2 illustrates, for exemplary purposes only, a multiplicity of cutting blades to show various of the myriad forms which the same may assume as dictated by the work. Accordingly, an arrangement of linear cutting blades 3 may be provided for parallel and perpendicular lines of severance; annular cutting blades 4, 4' may be presented; blades of sinuous shape are shown at 5; and arcuate blades are indicated at 6. It must be recognized that cutting die A shown in FIGURE 2 is to be considered an illustrative composite and hence not necessarily one which might be actually used in such form since it is unlikely that any one article of work would require masking removal in the manner possible by use of such a die. However, for purposes of consistency the cutting blade arrangement of FIGURE 2 is carried out in FIGURE 4.

Referring now to FIGURE 3, showing a single linear blade 3 for facilitation of understanding of the invention, it will be seen that cutting blades B have an overall height greater than that, or, as it were, the thickness, of base plate 1. Each blade B is honed or otherwise sharpened on its upper edge to provide a cutting edge as at $s$. Blades B of the linear, sinuous, and arcuate type as indicated respectively at 3, 5, 6, are provided at spaced points throughout their extent, depending entirely upon the length of the particular blade, with recesses 7 extending upwardly from the lower edge of said blades and terminating spacedly from the top edge for receiving bridge sections 8 integral with plate 1 which extend transversely across the related slot-like opening or receptacle 2, being flush on their lower ends with the under surface of the base plate 1 and with their upper ends terminating downwardly of the upper surface of the related base plate 1. Said recesses 7 are of greater vertical extent than the related bridges 8 and are slightly wider for clearance purposes. Thus, the said blades in the regions of their recesses 7 are adapted to straddle bridges 8. The transverse extent of openings or blade receptacles 2 for blades 3, 5, and 6 is but only slightly greater than the thickness of the related blade so that although the latter are vertically movable within such openings 2 there is provided a limited frictional contact between the opposed walls of the opening and the received blade whereby lateral support is accorded said blades for assuring of appropriate vertical attitude of the same at all times. With the lower edge of a blade, such as 3, aligned with the under surface of base plate 1, the said blade will project a predetermined distance above the upper surface of plate 1 (as indicated in full lines in FIGURE 3) and in which position the upper end of recesses 7 will be spaced from the upper end edge of the proximate bridge 8. Thus, upon the application of force upon the upper edge of blades 3, 5, 6, the same may be moved downwardly within their associated opening or receptacle 2. Bridges 8 serve as detents for restricting the downward travel of blades 3, 5, 6 (as illustrated in phantom lines in FIGURE 3). Although in actual use the said blades do not travel such distance as to cause same to be brought into contact with their related bridges. Additionally, bridges 8 serve to prevent accidental downward dislodgement of the blades from their openings during manufacture or handling of the dies A.

Provided for affixation to the bottom of base plate 1, as by suitable attaching means, such as by bolts 9, or in lieu of bolts, suitable adhesive, is a co-extensive resilient section or block 10, as of rubber, polyurethane, and like material having a relative hardness so as to provide a stable, yet yieldable, support for blades B. It has been found in practice that a hardness in the durometer range of 40 to 90 is desired and that polyurethane, rubber is a material of preference. The hardness, or contrarywise the yieldability of section 10 is dictated by the extent of downward travel of the blades to be effected during operation, as will be seen hereinbelow. Normally the lower edge of blades B will rest upon the upper surface of section 10 which thus provides a floor for openings 2. However, if blades B are forced downwardly within their respective openings 2 by applied force, said section 10 will "give" (see FIGURE 4) to allow said blades to be moved in the direction of the force.

Referring to FIGURE 2 there will be noted a series of circular openings $h$ which merely constitute starter holes for jigsaw blades for effecting the cutting, or provision, in plate 1, if of wood, of the slot-like openings or receptacles 2 for blades B. Thus, said openings $h$ do not form a part of the present invention but are shown merely from a sense of completeness in view of the fact that wood is a preferred material of construction for base plate 1.

In operation, cutting die A is firmly disposed mounted upon the bed 11 of a press P of conventional design having a vertically movable head 12. Through the inherent resiliency of section 10, blades B will be biased into full upward position (see full lines FIGURE 3). Placed upon the upper edges of blades B is an article of work $w$, predetermined zones of which are to be subjected to acid treatment as necessitated by design, decoration, and weight requirements. For purposes of description only, the said article of work $w$ is shown in FIGURE 4 as a metal plate 13 which, at least, on one face is covered with a layer of masking 14, which may be conventional or any suitable applied coating, which covered face is presented upon said blades B. A section or block 15 of resilient material, such as of gum rubber, or the like, is disposed on the upper surface of said metal plate 13 for interposition between same and the adjacent portion 12' of head 12 so as to prevent any damaging contact between said plate 13 and the press head 12.

As discussed above, it will be understood that the disposition or arrangement of blades B, as well as their specific configuration, will be determined by the areas or zones of masking 14 on plate 13 which are to be severed for subsequent facile removal by normal peeling action to expose the specific areas of plate 13 for treatment. With plate 13 disposed in the manner stated, head 12 of press P is lowered so as to provide a forceful contact between plate 13 and the upper ends of blades B under a predetermined pressure. By such action the edges $s$ of blade B will penetrate masking 14 only to a depth coincident with the thickness of such masking 14 effecting a cutting thereof while avoiding damaging contact with the metal of plate 13. Should the force acting upon plate 13 exceed that designed to limit the cutting action of blades B only to that of masking 14, the said blades B will be moved downwardly in acting against the resiliency or "give" of section 10 as suggested graphically at 20 in FIGURE 4. Thus, blades B will be caused to move away from plate 13, that is, in the direction of the applied force, as opposed to being held rigid in resistance thereto, so that undesired depth of cut is prevented and the metal confronting blades B is unmarred. The floating mounting of blades B assures that only the masking 14 will be severed and that the metal will be preserved in an unscathed state. After the subjection of the masking 14 to blades B, the areas of the masking 14 delineated by the line or lines of cut may be readily peeled off, exposing portions of plate 13 for ultimate acid treatment, with full recognition that only the intended areas, and to the desired extent, will be affected.

As indicated above, annular blades or cutters 4, 4' have been shown merely to indicate that completely circular configurations may be cut in masking 14 by use of the present invention. However, such cutters 4, 4' have an outside diameter which approximates the inside diameter of the corresponding openings as at 24, 24' respectively, in base plate 1 so that through friction the same will normally be restrained against displacement from plate 1. Otherwise said annular cutters 4, 4' act in the same manner as the linear blades 3, with section 10 normally urging same upwardly, while providing necessary yieldability in use.

For the effective operation of the present invention there must be considered the pressure to be applied by head 12, or the distance of travel thereof, and the hardness of the section 10. The hardness of section 10 must be greater than that of the masking, whether coating or tape, so that as the head commences its movement and forces the work $w$ against the blades the latter will penetrate the masking for severance of same but upon continued movement of the head the blades will be caused to move downwardly through the yielding of section 10. Thus, by the unique balancing of the various factors, the blades will sever the masking but be prevented from scratching or in any way cutting the underlying metal by reason o fthe "giving" of section 10. The compressibility of section 10 will dictate the distance of travel of the head for if the head travels beyond the point of yielding of section 10 then the blades would be necessarily brought into damaging contact with the metal of the work. Accordingly, the present invention uniquely provides a cutting die which permits the blades to have sufficient support for penetrating the masking while being caused to "float" subsequent to masking cutting to prevent destructive contact with the metal.

If desired, another form of linear cutting blade 30 may be provided for use in cutting masking 14 applied upon articles of work $w'$ which may be of general arcuate or rounded character, such as the metal plate indicated at 31, or which articles $w'$ may have masking coatings of varying thicknesses, as resulting from expected unevenness in application. Such cutter blades 30, having an upper cutting edge $s'$, are provided throughout their length with a multiplicity of elongated recesses 32 extending inwardly from their lower edge to a point proximate their upper or cutting edge $s'$, so as to cause the intervening portions 33 of said blade 30 to assume a tooth- or tine-like character. The central recess 32' is preferably of greater width than the other recesses 32, being designed to accommodate a bridge 38 extending transversely across the related opening or block receptacle 2' substantially intermediate its length. Said bridge 38 terminates at its upper end spacedly from the upper surface of the associated plate 1' so as to allow vertical reciprocal movement of blades 30 in the manner of blades 3 hereinabove described, and serves to prevent dislodgment of the blades from their respective openings. Upon application of the pressure exerted by press head 12, driving plate 31 downwardly upon edge $s'$, blade 30 will bend in conformity to the rounded or arcuate contour of plate 31, or will assume a wavy or undulating attitude in response to a corresponding contour in the work piece. Thus, blade 30 is by its peculiar construction rendered highly flexible so as to conform to any given configuration. The arrangement of recesses 32, or, in other words, the tooth-like character of blade 30, endows blade 30 with the desired flexibility so that the same may assume a configuration compatible with that of the article of work *w'*. Accordingly, said blade 30 further indicates the extreme versatility of the present invention demonstrating that both planar, rounded, uneven surfaces may be used with equal facility.

In view of the foregoing it will thus be seen that the cutting dies of this invention provide a solution to a problem which has long beset industry, and especially the aircraft construction industry, by providing a tool which will cuttingly delineate predetermined masked zones for total or partial removal from metal parts, but without causing any damage to the remaining metal. The present invention has clearly obviated the heretofore acceptance by industry of imperfections resulting from etching, as in weight reduction, by reason of the furrowing, scratching, or otherwise damaging of metal to be treated.

It should be understood that changes and modifications in the formation, construction, arrangement, and combination of the several parts of the Masking Cutter may be made and substituted for these herein shown and described without departing from the nature and principle of our invention.

Having thus described our invention, what we claim and desire to secure by Letters Patent is:

1. A cutting die comprising a base plate having upper and lower parallel surfaces, at least one slot-like opening formed in said base plate for extension therethrough, a cutting blade member disposed in said slot-like opening for vertical movement therein, and means provided proximate the lower surface of said plate and at the lower end of said opening for urging said blade member upwardly within said opening.

2. A cutting die as defined in claim 1 and further characterized by said cutting blade having a height greater than the thickness of said base plate for normal extension of its upper edge beyond the upper surface of said base plate.

3. A cutting die comprising a base plate having upper and lower parallel surfaces, at least one narrow slot-like opening provided in said plate for extension from said upper surface to said lower surface, a cutting blade disposed in said opening for vertical movement therein, a resilient member provided on the under surface of said base plate for extension across the lower end of said opening for normally urging said blade upwardly within said opening.

4. A cutting die comprising a base plate having upper and lower parallel surfaces, at least one narrow slot-like opening formed in said plate for extension between the upper and lower surfaces thereof, a cutting blade disposed in said opening for vertical movement therein, the transverse extent of said opening being but slightly greater than the thickness of said blade, said blade having a height greater than the thickness of said base plate, and a resilient member extending across the lower end of said opening for engaging the lower end of said blade for urging same normally upwardly within said opening but yieldingly allowing downward movement of said blade when subjected to a downwardly directed force.

5. A cutting die as defined in claim 4 and further characterized by means provided within said opening for restricting downward movement of said blade.

6. A cutting die as defined in claim 5 and further characterized by said resilient member having a durometer hardness of from 40 to 90 and said blade being of steel rule stock.

7. A cutting die as defined in claim 4 and further characterized by said blade having at least one recess extending upwardly from its lower edge and terminating spacedly from its upper edge, and means presented within said opening for reception within said blade recess for abutting the upper edge thereof to limit downward travel of said blade within said recess.

8. A cutting die as defined in claim 4 and further characterized by at least one bridge member extending between opposed sides of said opening, said bridge terminating spacedly from the upper surface of said base plate, said blade having at least one recess extending upwardly from its lower end and terminating spacedly from its upper end, said recess having a width greater than said bridge for freely accommodating same, the height of said recess being greater than the height of said bridge whereby the differential determines the extent of permissible downward travel of said blade within said opening.

9. A cutting die as defined in claim 1 and further characterized by said cutting blade being of annular configuration and said opening being circular for receiving said annular cutting blade, the outside diameter of said cutting blade and the diameter of said opening being substantially the same.

10. A cutting die as defined in claim 4 and further characterized by said blade having a plurality of recesses extending upwardly from its lower edge and terminating proximately its upper edge, said recesses being normally axially parallel and separated by narrow tooth-like blade sections whereby the upper edge of said blade is rendered flexible for conformity to non-planar surfaces.

References Cited by the Examiner

UNITED STATES PATENTS

| | | | |
|---|---|---|---|
| 2,341,503 | 2/1944 | Bombard | 83—698 |
| 3,008,366 | 11/1961 | Taylor | 83—582 |
| 3,116,536 | 1/1964 | Tobey | 83—669 |
| 3,170,358 | 2/1965 | Martin | 83—698 |
| 3,228,275 | 1/1966 | Taber | 83—588 |

WILLIAM S. LAWSON, *Primary Examiner.*

WILLIAM W. DYER, JR., *Examiner.*